Figure 1:
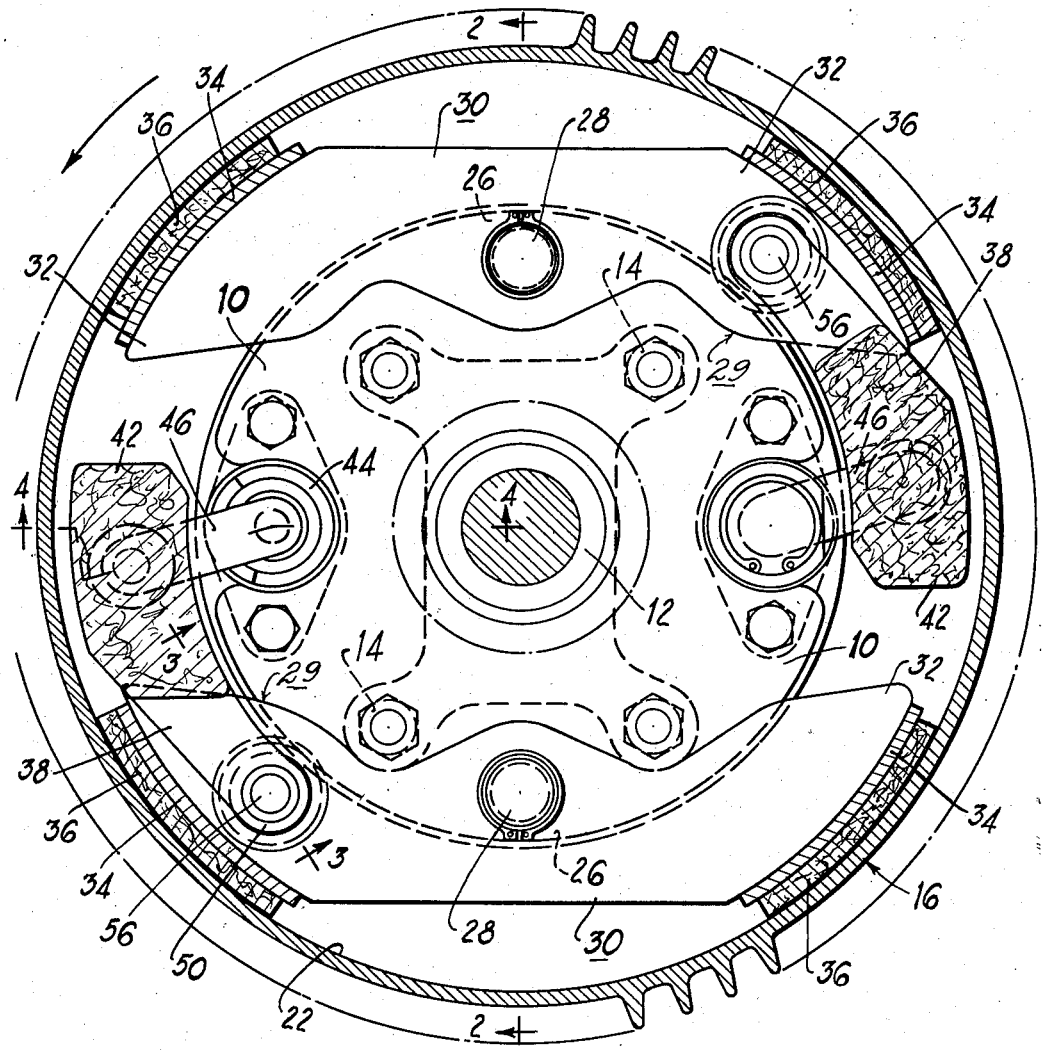

May 26, 1959 — R. T. BURNETT — 2,888,105
COMPOSITE DISK AND SHOE BRAKE
Filed Dec. 20, 1954 — 4 Sheets-Sheet 1

INVENTOR.
RICHARD T. BURNETT
BY John A. Young
ATTORNEY

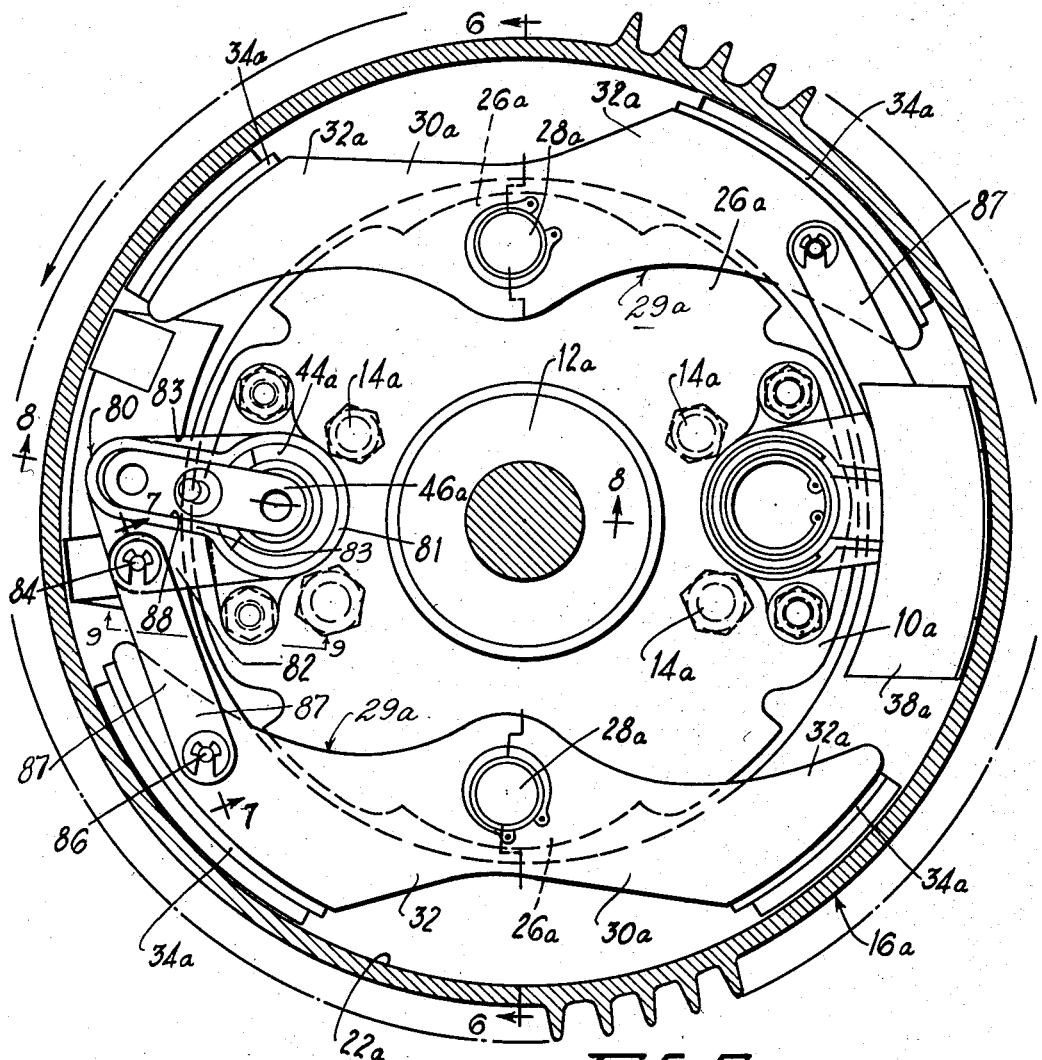
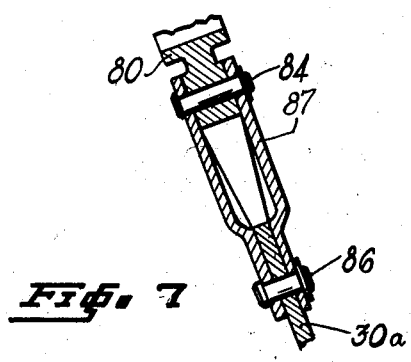
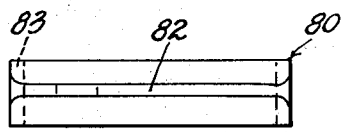
Fig. 5
Fig. 7
Fig. 9
INVENTOR.
RICHARD T. BURNETT
BY
John A. Young
ATTORNEY May 26, 1959 R. T. BURNETT 2,888,105
COMPOSITE DISK AND SHOE BRAKE
Filed Dec. 20, 1954 4 Sheets-Sheet 4

INVENTOR.
RICHARD T. BURNETT
BY
John A. Young
ATTORNEY

United States Patent Office 2,888,105
Patented May 26, 1959

2,888,105

COMPOSITE DISK AND SHOE BRAKE

Richard T. Burnett, South Bend, Ind., assignor to Bendix Aviation Corporation, South Bend, Ind., a corporation of Delaware Application December 20, 1954, Serial No. 476,170

10 Claims. (Cl. 188—74)

This invention relates to a brake and more specifically to a composite brake, having distinct friction elements which are both axially and radially applied.

Reference should be made to my co-pending application No. 433,609, filed June 1, 1954 for further explanation of structure herein disclosed. The present invention illustrates additional means of utilizing "disk" braking reaction as the actuating force for radially movable friction elements.

An important feature of the present invention relates to brake controllability. This characteristic has to do with the relationship between retarding force on the vehicle and the applying effort of the operator. Brake controllability is highly important in a vehicle brake, and to achieve optimum controllability it is necessary to obtain consistency in performance of the brake during the course of a stop.

Another desirable quality of automotive brakes is related to pedal travel. It is considered very objectionable to have a varying pedal stroke which increases as lining wear progresses. The response time in applying the brake is very greatly increased, and the pedal characteristics are not fixed to give the operator consistent brake performance with equivalent applying effort. From these prefatory statements it will become apparent that the following objects of the invention are highly significant.

The foremost object of the invention is to obtain brake controllability in which the retarding effort of the brake on the vehicle is substantially proportional to the operator's applying effort throughout the course of a stop and throughout the wear life of the brake.

Another object of the invention is to provide braking effectiveness which is not appreciably affected by the direction of movement of the vehicle which is to be impeded.

A further object of the invention is to obtain automatic adjustment of the friction elements according to the degree of wear thereof, so that the pedal travel characteristics of the brake remain substantially uninfluenced by lining wear.

A further object of the invention is to translate pivoting movement of one friction element to radial application of another through a linkage which is characterized by simplicity in construction and economy in cost.

Other objects and features of the invention will appear more fully from a consideration of the following description, taken in connection with the drawing, wherein a plurality of embodiments of the invention are illustrated by way of example.

Figure 3:
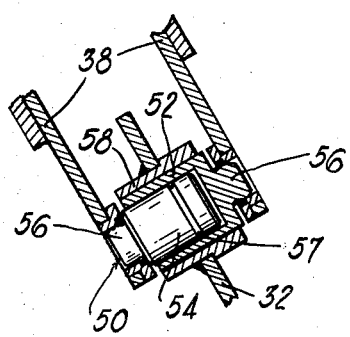
Figure 4:
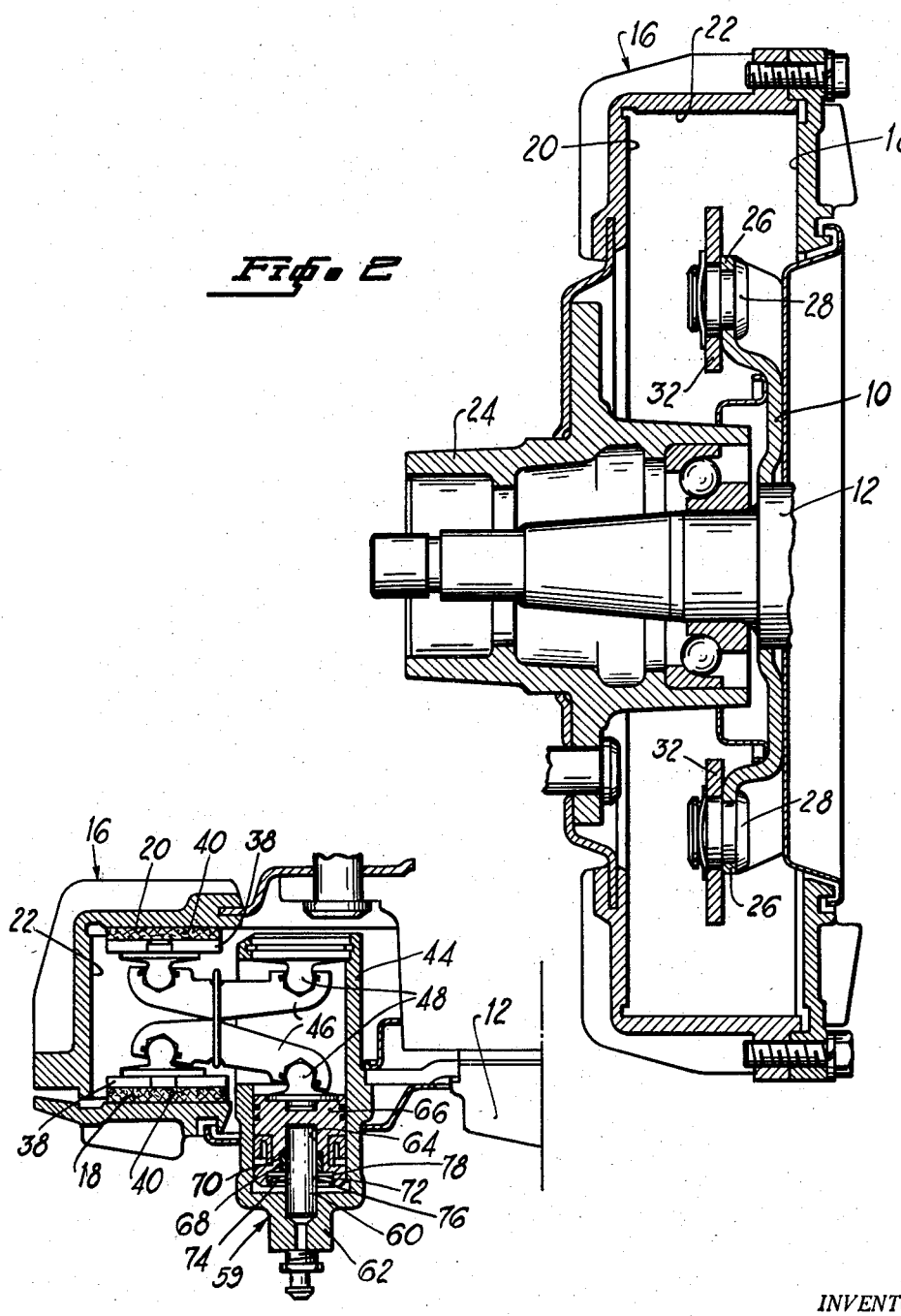
Figure 6:
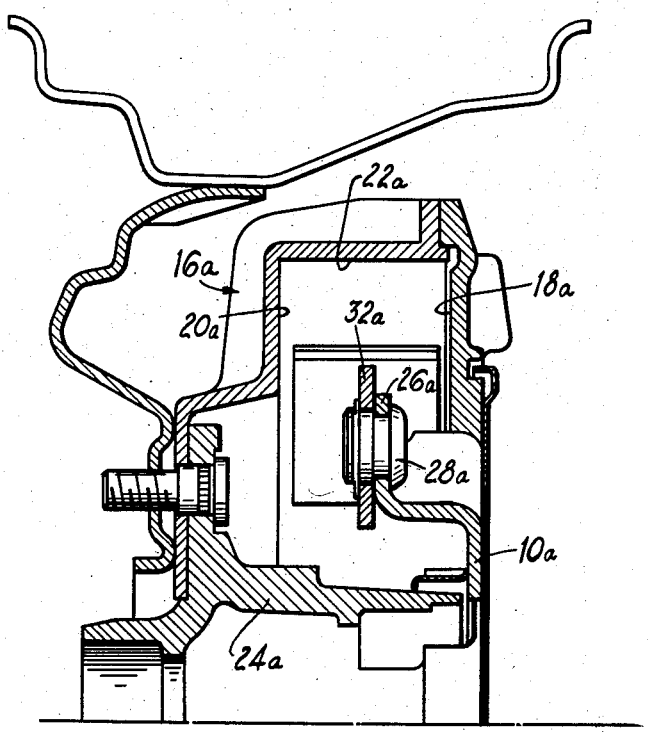
Figure 8:
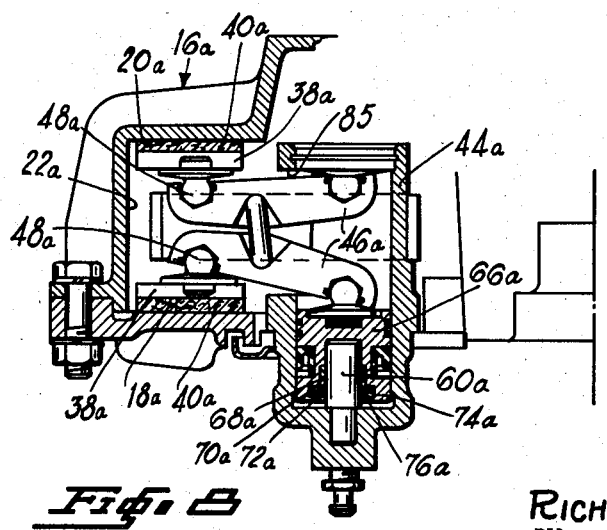

In the drawings:

Figure 1 is a side elevation of a brake assembly illustrating one embodiment of the invention;

Figures 2, 3 and 4 are section views taken respectively on the lines 2—2, 3—3, and 4—4 of Figure 1;

Figure 5 is the side elevation view of a second embodiment of the invention, a part of the brake on the left hand side being removed to show the actuating mechanism;

Figures 6, 7, and 8 are section views taken respectively on lines 6—6, 7—7, and 8—8 of Figure 5; and, Figure 9 is a detail side view of the cage element forming a portion of the actuating mechanism.

Referring to the embodiment shown in Figures 1 to 4, a support plate 10 is secured to a fixed part of the vehicle, as for example spindle 12, by means of fastening devices 14. A rotor 16 having oppositely facing disk surfaces 18 and 20 joined by a cylindrical drum surface 22 is secured to a rotatable part of the vehicle, as for example hub 24.

The support plate 10 has radially extending portions 26 (Figure 2) which are laterally offset from the center portion thereof. The offset portions 26 have anchors 28 suitably secured thereto.

Two identically constructed brake units 29 are fitted within the rotor 16. Pivotally mounted on anchors 28 are two arcuate shoe friction elements 30 (of the same construction) which form a part of the brake units.

Each of the arcuate shoe friction elements is composed of a web 32 having a transverse rim 34 formed along a segment of the periphery of the web at opposite sides of the associated anchor 28. The rims 34 are provided with friction material lining 36 engageable with surface 22 of the rotor 16.

To apply the arcuate shoe friction elements 30, I provide two disk elements 38 for each of the brake units. These disk elements have friction material lining 40 which is engageable with the surfaces 18 and 20 of the rotor (Figure 4). The disk friction elements 38 are sometimes referred to as "flat shoes," to differentiate them from the arcuate shoe friction elements which are radially applied. The term "flat shoes" is used interchangeably with "disk friction elements" since the two are equivalent. At one end 42 of each of the "flat shoes" 38 there is provided an actuating mechanism comprising a fluid motor 44 and articulated levers 46 connected with the "flat shoes" through ball socket joints 48. The "flat shoes" are connected to the friction elements 30 through a rotatable connection 50 (Figure 3). This connection 50 consists of cylinders 52 and 54 which are slidably interfitted and fastened at opposite ends to the flat shoes 40 through a snap-ring and recess arrangement 56. Cylinder 52 is slidably received in a bushing 58 which is fixedly secured to the web 32 of the pivoted friction element at one end thereof. A ring 57 is mounted on the periphery of cylinder 54 to resist sliding of cylinder 54 within cylinder 52.

An automatic adjusting device 59 (Figure 4) is provided in each fluid motor 44 to compensate for wear of the lining 40 on "flat shoes" 38. The automatic adjusting device is constructed about a fixed post 60 which is fastened at one end thereof to cylinder 62. The post 60 extends into a recess 64 provided in piston 66 which is reciprocably received in the cylinder 62. A sleeve 68 frictionally grips the surface of the post 60. A shoulder 70, which is formed in piston 66, contacts sleeve 68 and thus the sleeve 68 serves to limit retraction of the piston 66. A curved washer 72 is received in a recess 74 formed in the piston 66. The curved washer 72 is compressed between shoulder 76 and annular member 78 which bears against sleeve 68.

Assume in operation, that the brake is applied with the rotor turning counterclockwise as shown in Figure 1. Fluid pressure from a master cylinder source (not shown) is transmitted to cylinder 62 where it causes movement of the piston 66 (Figure 4) in an upwardly direction. Piston movement causes rocking of articulated levers 46 which in turn act to spread the "flat shoes" 38. The "flat shoes" 38 are forced apart thus engaging friction material lining 40 with the surfaces 18 and 20 of the rotor. It will be noted that the ends 50 of the "flat shoes" are forced apart during "flat shoe" application, this being permitted by the slidable interfitting of cylinders 52 and 54. The two flat shoes may move together in either direction (Figure 3) since cylinder 52 is slidable in bushing 58. The flat shoes 38 are thus completely engaged along their entire length with the disk surfaces 18 and 20.

Assuming counterclockwise rotor movement in the direction indicated, (Figure 1) engagement of the flat shoes with the disk surfaces causes them to move circumferentially with the rotor, thus producing swivelling of the levers 46 on the ball socket connections with the wheel cylinder and flat shoes. Torque reaction from engagement of the flat shoes is transmitted to the shoe friction element 30 through ends 50 of the flat shoes to the bushing 58 and the web 32.

Further explanation of operation is with reference to the brake unit at the lower left hand side of Figure 1. The torque transmitted from the "flat shoes" to the shoe friction element 30 causes counterclockwise turning of the shoe friction element 30 on anchor 28, thus forcibly engaging the friction material lining 36 on the left hand side of the element with surface 22 of the rotor 16.

During braking with opposite rotor movement, engagement of the "flat shoes" with surfaces 18 and 20 of the rotor, causes circumferential movement of the "flat shoes" with the rotor, in a clockwise direction. This movement of the "flat shoes" imposes clockwise movement of the shoe friction element 30 about anchor 28 thus forcibly engaging friction material lining 36 on the right hand side of the shoe element 30 with surface 22 of the rotor.

It will thus be seen that during braking in either direction, there is obtained both "flat shoe" braking and arcuate shoe braking, with the torque reaction of the former serving as applying effort for the latter.

With brake usage, the lining 40 on the "flat shoes" is worn. This lining wear is compensated for by operation of the automatic adjustor which will next be described.

As the piston 66 in Figure 4 is moved upwardly, the curved washer 72 is flattened, and the shoulder 70 on the pitson 66 moves away from contact with the sleeve 68 while the curved washer 72 is being loaded. After the washer 72 is substantially flattened, any further piston movement exerts an upwardly directed force on the sleeve 68 through the washer 72 and annular member 78. This force is sufficient to overcome the friction force between the sleeve 68 and the post 60. The sleeve 68 is thus forced upwardly on the post 60 and this upward movement continues until piston movement stops, indicating that the lining 40 is completely applied against the sides of the rotor.

When the brake pressure is relieved, the now flattened washer 72 exerts a downwardly directed force on the piston 66 through the shoulder 76 as it tends to resume its original curved shape. The resilience of the washer 72 forces the piston 66 in a downwardly direction until the shoulder 70 engages friction sleeve 68 which has been advanced to a new position in the manner before described. It will be noted that the effect of operation of the adjustor is to limit retraction of the piston 66, to a predetermined distance, represented by movement of the piston necessary to flatten the washer 72.

The extent of retraction of the piston 66 determines clearance of the lining 40 on the "flat shoes" from surfaces 18 and 20. This clearance will not be exceeded because of lining wear, since the piston moves upwardly in increments defined by successively higher positions of the sleeve on the post 60.

Considering next the embodiment shown in Figures 5 to 8, parts of the brake assembly corresponding to those already described, will be referred to by the same reference numeral with the subscript a.

Support member 12a is secured by fastening members 14a to a fixed part of the vehicle as in the previous embodiment. A rotor 16a is secured to a movable part of the vehicle such as hub 24a. The rotor 16a has three distinct friction-element-engaging surfaces; disk friction surfaces 18a and 20a, and cylindrical drum surface 22a. The support plate 12a has radially extending portions 26a (Figure 6) which are offset laterally from the central portion thereof. These offset portions 26a have anchor members 28a fastened thereto.

Two identically constructed brake units 29a are provided. Each brake unit includes shoe friction elements 30a which are pivotally mounted on anchor members 28a.

The principal difference of this embodiment over the prior embodiment, is the manner in which torque reaction from application of the "flat shoes" 38a is transmitted to the shoe friction element 30a to produce pivoting thereof. A strut 87 interconnects cage 80 and arcuate shoe element 30a through pin connections 84 and 86 (Figure 7). The levers 46a are free to swivel on ball socket joints 48a shown in Figure 8; this swivelling movement produces turning of the cage 80.

The cage 80 has a cylindrical portion 81 and an oblong portion 82. A strengthening rib 83 is provided at one side of the cage. The center of the cage is apertured as shown in Figure 5, and the levers 46a are received therein. It will be further noted that the cylinder 44a is slotted at 85 to permit swinging of the levers on ball joint connections 48a.

An automatic adjustor is incorporated into the fluid motor and is similar to the one shown in Figure 4. This automatic adjustor consists of a fixed stem 60a, an annular member 68a frictionally gripping the fixed stem 60a, and a curved washer 72a which is mounted in recess 74a formed in piston 66a. The curved washer 72a is compressed between the shoulders 76a and annular member 68a. The annular member 68a abuts with the shoulder 70a to limit retraction of piston 66a.

The operation of the second embodiment is substantially the same as that of the first embodiment. Fluid pressure is introduced to cylinder 44a, and the piston 66a is forced in a generally upward direction, spreading the "flat shoes" 38a through links 46a and engaging lining 40a with the sides 18a and 20a of the rotor. The reaction which is developed by engagement of the "flat shoes" with the rotor, causes the "flat shoes" to shift circumferentially with the rotor, in a counterclockwise direction, for example, when the rotor is moving in the direction of the arrow in Figure 5. The levers 46a rotate about the fluid motor 44a, swivelling on their ball socket connection 48a with the flat shoes and fluid motor respectively. Rotation of the levers 46a causes turning of the cage 80 since these two latter members are abutted at 88 (Figure 5). Turning of the cage is transmitted as applying effort on the shoe element 30a through the strut 82 and pinned connections 84 and 86. The shoe element 30a is thus caused to pivot about anchor 28a in a counterclockwise direction and the friction material lining on the left hand side of the shoe brake element (referring to the lower shoe brake element in Figure 5) is forced against surface 22a of the rotor. During braking in opposite direction of rotor movement, engagement of the "flat shoes" causes clockwise turning of the cage 80 about the fluid motor which, through the strut 87, produces clockwise pivoting of shoe brake element 80a engaging the right hand side of the shoe brake element 30a with surface 22a of the rotor.

The automatic adjustor operates similarly to the one previously described. The annular member 68a serves as a stop for the piston 66a, limiting its retraction according to wear of the lining of the "flat shoes." As the piston 66a is caused to move upwardly, it produces flattening of the curved washer 72a which then overcomes the frictional forces between the annular member 68a and the post 60a. The curved washer 72a is thus loaded by upward piston movement, and this loading is available to produce downwardly directed force on the piston 66a when the brake pressure is relieved. The annular member 68a is moved upwardly by successive adjusting increments, responsively to piston movement in an amount exceeding the determined clearance.

Although only two embodiments of the invention have been described, numerous modifications of the invention will occur to those skilled in the art. I intend therefore to include within the scope of the following claims all equivalent devices which are similar in structure and function in substantially the same manner as that described.

I claim:

1. A brake comprising a support member, two radially-applied friction elements each having a friction material lined rim at the remote ends thereof, each of said radially-applied friction elements being pivoted between the ends thereof at spaced points on the support member so that pivotal movement in either direction produces radially outward actuation of one of said ends, a pair of oppositely-acting disk elements combined with each of said radially-applied friction elements, said disk elements being limitedly circumferentially movable, means operatively connecting each of said radially-applied friction elements to the associated pair of disk elements whereby shiftable movement of said disk elements produces pivotal movement of the radially-applied friction element to apply one or the other of the remote ends thereof, an applying linkage for actuating each of the pairs of said disk elements, and a fluid motor to operate said linkages.

2. A brake comprising a supporting member, a U-shaped cross section rotor having three engageable surfaces, two oppositely-acting disk elements mounted within said rotor and engageable with two of the surfaces of said rotor for limited circumferential shiftable movement therewith, an arcuate radially-applied friction element, a single pivot for said radially-applied friction element, said radially-applied friction element being movable about said single pivot during braking in either direction of rotor rotation, a fluid motor transversely mounted in said supporting member, an applying linkage between said disk elements and fluid motor, and means operatively interconnecting said disk elements and radially-applied friction element whereby shiftable movement of said disk elements in either circumferential direction with the rotor produces radially outward movement of said arcuate friction element about its single associated pivot to obtain arcuate shoe braking in either direction of rotor rotation.

3. A brake comprising a supporting member, a U-shaped cross section rotor having three engageable surfaces, and two brake units each comprising two operatively interconnecting said disk elements and radially the surfaces of said rotor and engageable therewith, said disk elements being limitedly shiftable with said rotor in a circumferential direction, an arcuate radially-applied friction element, a single pivot for said radially-applied friction element, said radially-applied friction element being movable about said pivot during braking in either direction of rotor rotation, a fluid motor transversely mounted in said supporting member, an applying linkage between said disk elements and fluid motor, and means operatively interconnecting said disk elements and radially-applied friction element whereby shiftable movement of said disk elements with the rotor and in either circumferential direction produces radially outward movement of said arcuate friction element about its single associated pivot to obtain arcuate shoe braking in either direction of rotor rotation.

4. In a kinetic energy absorbing device, a support member, a first friction element consisting of a web and two spaced apart arcuate rim portions, the web of said first friction element being adapted for pivotally mounting said element on the support member intermediate the two rim portions, second friction elements movable apart in opposite directions along a line parallel to the pivotal axis of said first friction element and shiftable in a plane parallel to the plane of pivotal movement of said first friction element, an interconnection between said first and second friction elements to provide for pivotal movement of said first friction element when said second elements shift, and actuating means for moving apart said second friction elements.

5. A kinetic energy absorbing device comprising a support member, a shoe friction element pivotally mounted on said support member and having friction-element engaging surfaces located on opposite sides of said pivot, means for producing pivotal movement of said element including disk friction elements movable apart in opposite directions along a line parallel to the pivotal axis of said shoe friction element and shiftable in a plane parallel to the plane of pivotal movement of said shoe friction element, an operative connection between said shoe and disk friction elements, an actuating device for moving apart said disk elements, said device including a pressure responsive member and articulated levers interconnecting said disk elements and said pressure responsive member to move apart said disk elements, and automatic adjusting means defining the retracted position of said disk elements, said automatic adjusting means including a stem having one end extending within said pressure responsive member and fixed from movement relative thereto, a sleeve frictionally gripping a portion of the stem that extends within said pressure responsive member, an abutment between said pressure responsive member and sleeve which limits retractile movement of said pressure responsive member, a resilient annular member carried by said pressure responsive member and having an opening through which the stem extends, and a shoulder formed in said pressure responsive member against which the outer edge of the annular member abuts, said resilient annular member being thereby loaded during initial movement of said pressure responsive element with loading thereof causing retraction of said pressure responsive element when pressure thereon is released, said sleeve being slidable on the stem to assume successive adjusting positions which limit the retraction of said pressure responsive element.

6. A kinetic energy absorbing device comprising a support member, a first friction element pivoted on said support member and having friction element engaging surfaces on opposite sides of said pivot, second friction elements movable apart in opposite directions along a line parallel to the pivotal axis of said first friction element and shiftable in a plane parallel to the plane of pivotal movement of said first friction element, means for moving apart said second friction elements, and means operatively connected to said first and second friction elements for transmitting applying effort to said pivoted first friction element to produce pivotal movement thereof upon movement of said second friction elements, said transmitting means including a rotary cage operatively connected to said means for moving apart said second friction elements and a strut interconnecting said cage and one side of the first friction element.

7. A kinetic energy absorbing device comprising a U-shaped cross-section rotor, a support member, axially-applied oppositely-acting first friction elements engageable with spaced apart sides of said rotor and adapted to provide for limited circumferential shifting thereof upon engagement with said rotor, a radially-applied second friction element pivoted on said support member and engageable with the cylindrical surface of said rotor, means interconnecting said first and second friction elements and movable therewith in such a way that the torque developed from engagement of said first element with said rotor is transmitted as applying effort to said second element, actuating means for applying said first friction elements, said actuating means including a swiveled linkage and a fluid pressure responsive device for actuating said linkage, said linkage providing for limited circumferential movement of said first elements, and an automatic adjuster combined with said fluid pressure responsive device, said adjuster consisting of a stem fixed from movement relative to said device and having one end extending into said device, a curved washer having an opening through which said stem extends, a shoulder formed in said pressure responsive device against which the outer edge of said washer abuts, said washer being thereby deflective responsively to movement of said pressure responsive device, a sleeve gripping said stem and frictionally resisting relative movement therebetween, and an abutment between said pressure responsive device and sleeve which limits retractile movement of said pressure responsive device, said washer being arranged to produce sliding of the sleeve to successive adjusting positions, the resilience of said curved washer being sufficient to produce retraction of said pressure responsive device which is limited by abutment of said device with said sleeve.

8. A kinetic energy absorbing device comprising a pivoted first friction element having friction engaging surfaces located on opposite sides of the pivot, second friction elements movable in opposite direction along a line parallel to the pivotal axis of said first friction element and shiftable in a plane parallel to the plane of movement of said first friction element, an interconnection between said first and second friction elements whereby shifting of said second friction elements causes pivotal movement of said first friction element, actuating means including a pressure responsive member for applying said second friction elements, and an automatic adjuster for said second friction elements, said adjuster including a deflective resilient component carried by said pressure responsive member, a member fixed from movement relative to said pressure responsive member and extending through said resilient component, and a component slidable on said fixed member and defining the retracted position of said pressure responsive member, said slidable component frictionally resisting movement on said fixed member induced by said resilient component with a force sufficient to define successive retracted positions for said pressure responsive member.

9. A kinetic energy absorbing device comprising a U-shaped cross-section rotor having axially-spaced parallel sides joined by a cylindrical surface, a support member located within said rotor, a plurality of brake units carried by said support member, each of said units including oppositely-acting axially-applied first friction elements and a radially-applied second friction element pivotally mounted on said support member, said second friction element having friction engaging surfaces located on opposite sides of its pivot so that pivotal movement of said element in either direction will apply one or the other of said friction engaging surfaces against the cylindrical surface of said rotor, said first friction elements being adapted for limited circumferential shifting and engageable with the spaced parallel sides of said rotor, and means interconnecting said first and second friction elements to translate shifting of said first elements as applying effort on said second element and thereby engage one of the other of the friction engaging surfaces of said second element with the cylindrical surface of said rotatable member depending upon the direction of rotor rotation to be impeded.

10. A brake comprising a supporting member, a first friction element having friction engaging surfaces located on its opposite ends, means pivotally securing said friction element to said supporting member at a point intermediate the friction engaging surfaces thereof, a fluid motor received in said supporting member with the axis of said motor parallel to the pivotal axis of said first friction element, a linkage operated by said motor, second friction elements movable in opposite directions along a line parallel to the pivotal axis of said first friction element and shiftable in a plane parallel to the plane of movement of said first friction element, said second friction elements being movable apart by said linkage, rotary means hinged to said fluid motor and engageable with said linkage to be rotated thereby when the second friction elements shift, and a force transmitting member operatively interconnected between said rotary means and first friction element to produce pivotal movement of said first friction element responsively to turning of said rotary means.

References Cited in the file of this patent
UNITED STATES PATENTS

| | | |
|---|---|---|
| 1,608,392 | Hannah | Nov. 23, 1926 |
| 1,854,358 | Wilson | Apr. 19, 1932 |
| 2,065,382 | Levy | Dec. 22, 1936 |
| 2,174,398 | Farmer | Sept. 26, 1939 |
| 2,392,970 | Bricker | Jan. 15, 1946 |
| 2,496,699 | Clark | Feb. 7, 1950 |
| 2,751,046 | Tack | June 19, 1956 |

UNITED STATES PATENT OFFICE

CERTIFICATE OF CORRECTION

Patent No. 2,888,105                                         May 26, 1959

Richard T. Burnett

It is hereby certified that error appears in the printed specification of the above numbered patent requiring correction and that the said Letters Patent should read as corrected below.

Column 5, line 53, strike out "operatively interconnecting said disk elements and radi-" and insert instead -- oppositely-acting disk elements mounted between two of --.

Signed and sealed this 27th day of October 1959.

(SEAL)
Attest:

KARL H. AXLINE
Attesting Officer

ROBERT C. WATSON
Commissioner of Patents